United States Patent
Chen

[11] Patent Number: 6,160,369
[45] Date of Patent: Dec. 12, 2000

[54] OPTICALLY OPERATED AUTOMATIC CONTROL SYSTEM FOR WINDSHIELD WIPERS

[75] Inventor: Stephen Chen, Chang-Hua, Taiwan

[73] Assignee: E-Lead Electronic Co., Ltd., Chung-Hua, Taiwan

[21] Appl. No.: 09/416,421

[22] Filed: Oct. 12, 1999

[51] Int. Cl.[7] ........................................................ B60S 1/08
[52] U.S. Cl. .................... 318/444; 318/483; 318/DIG. 2; 15/250.12
[58] Field of Search .................................. 318/443, 444, 318/480, 483, DIG. 2; 15/250.12; 250/227.24, 227.25, 227.2; 356/335, 336

[56] References Cited

U.S. PATENT DOCUMENTS

| | | | |
|---|---|---|---|
| 4,476,419 | 10/1984 | Fukatsu et al. | 318/444 |
| 5,498,866 | 3/1996 | Bendicks et al. | 250/227.25 |
| 5,811,793 | 9/1998 | Pientka | 250/227.25 |
| 5,847,826 | 12/1998 | Fukui et al. | 356/335 |
| 5,923,027 | 7/1999 | Stam et al. | 250/208.1 |

*Primary Examiner*—Bentsu Ro
*Attorney, Agent, or Firm*—Rosenberg, Klein & Lee

[57] ABSTRACT

An optically operated automatic control system for a vehicle's windshield wipers can automatically activate the windshield wipers or a water dispenser filled with cleansing agent in response to the amount of rain cast on a windshield or the level of dirtiness of the same. Thus, a clear vision is constantly kept through a windshield glass for the driver of a vehicle to see. The automatic control system is mainly equipped with a photography device at a proper position adjacent the windshield to take the vision in front of a vehicle via the windshield. Afterwards, a series of calculations via a number of preset mathematical equations are conducted so as to get the wiper control system or the water dispenser to automatically operate accordingly. Thus, the windshield glass of a vehicle can always be kept clear and clean for a driver in driving to see through any time.

5 Claims, 5 Drawing Sheets

OPTICALLY OPERATED AUTOMATIC CONTROL SYSTEM FOR WINDSHIELD WIPERS

BACKGROUND OF THE INVENTION

The present invention relates to an optically operated automatic control system for a vehicle's windshield wipers, which can automatically activate the windshield wipers or a water dispenser filled with cleansing agent in instant response to the amount of rainwater cast on a windshield or the level of dirtiness of the same. Thus, a clear and clean vision can constantly kept through a windshield for the driver of a vehicle. The automatic control system is mainly equipped with a photography device disposed at a proper position adjacent the windshield to take the view in front of a vehicle via the windshield. Then a series of calculations via preset mathematical equations are conducted so as to get the wiper control system or the water dispenser to automatically operate accordingly whereby the windshield of a vehicle can always be kept clear and clean for a driver in driving any time to see through.

Windshield wipers are standard equipment for vehicles and are commonly activated to work when rainwater casts on a windshield or when the windshield glass gets dirty. In a case of rainwater casting on a windshield, the wipers are regulated of their speed according to the amount of rainwater poured on a windshield. When the amount of rain cast on a windshield becomes irregular, a driver must frequently adjust the speed of the operation speed of wipers of a vehicle, especially the amount of rainwater shed on a windshield is very small (such as drizzles) or in a shower. But the available speeds are limited in 3 or 4 stages in a prior vehicle's wiper system. In case of muddy water shedding on a windshield when two vehicles come across on a bumpy road having holes filled with muddy water, drivers of vehicle are not ready for quick response to such an emergent situation, the front vision becomes too blur to see at all. As drivers notice the emergency and make a proper response to start wipers on windshields, the vehicles have rushed forward such a long distance in a rather dangerous situation. The drivers are just driving in blind folded manner for seconds. The jeopardy is beyond our imagination.

The present inventor noticed the disadvantages associated with conventional windshield wipers and then worked to come up with an optically operated automatic wiper control system. It is made up of a photography device, a signal processing unit, a control unit. The system operates in cooperation with a windshield wiper system and a water dispenser system of a vehicle, operating to constantly keep the windshield of a vehicle clear and clean for a driver to see through in driving in any conditions and at any time.

SUMMARY OF THE INVENTION

Therefore, the primary object of the present invention is to provide an optically operated automatic control system for a vehicle's windshield wipers or a water dispenser which can be automatically activated according to the amount of rainwater cast onto the windshield or the level of dirtiness of the same at any moment or in any conditions whereby clear vision can be constantly kept for a driver to see through a clean windshield glass of a vehicle.

DETAILED DESCRIPTION OF THE PREFERRED EMBODIMENT

The components of the present invention and the operation modes thereof are described in details along with the accompanied drawings hereinafter.

Figure 1:
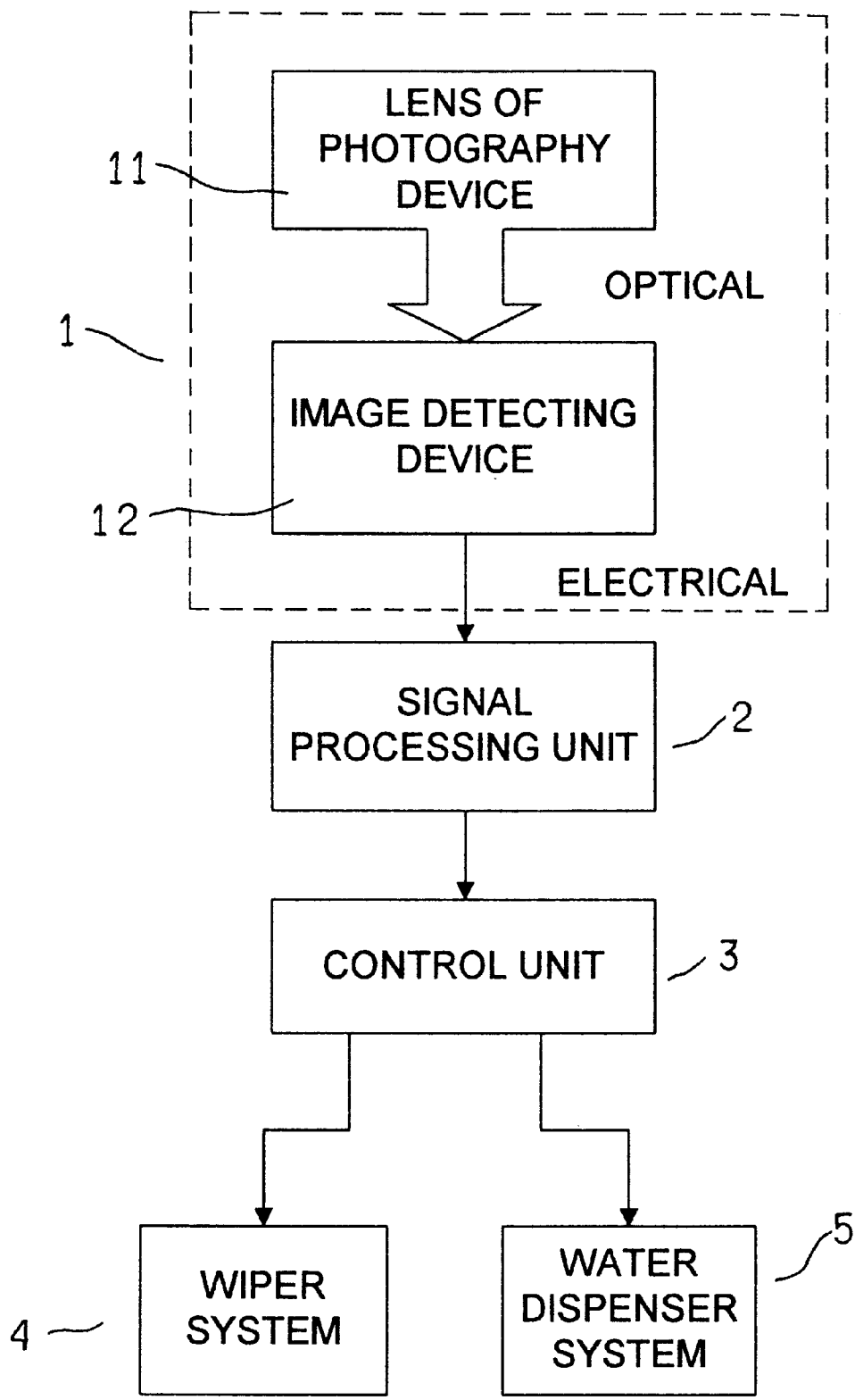
FIG. 1 is a diagram showing the block diagram of the present invention.

Referring to FIG. 1, the block diagram of the present invention is illustrated. It is comprised of a photography device 1, a signal processing unit 2 and a control unit 3, operating in cooperation with a windshield wiper system and water dispensing system 5.

The photography device 1 is generally referred to the combination of a camera lens 11 and an image detection device 12.

The signal processing unit 2 is used to do the handling and calculation of the related signals.

The control unit 3 is controlled by the signal processing unit 2 to activate and regulate the operation mode of the windshield wiper system 4 and the water dispensing system 5.

Figure 2:
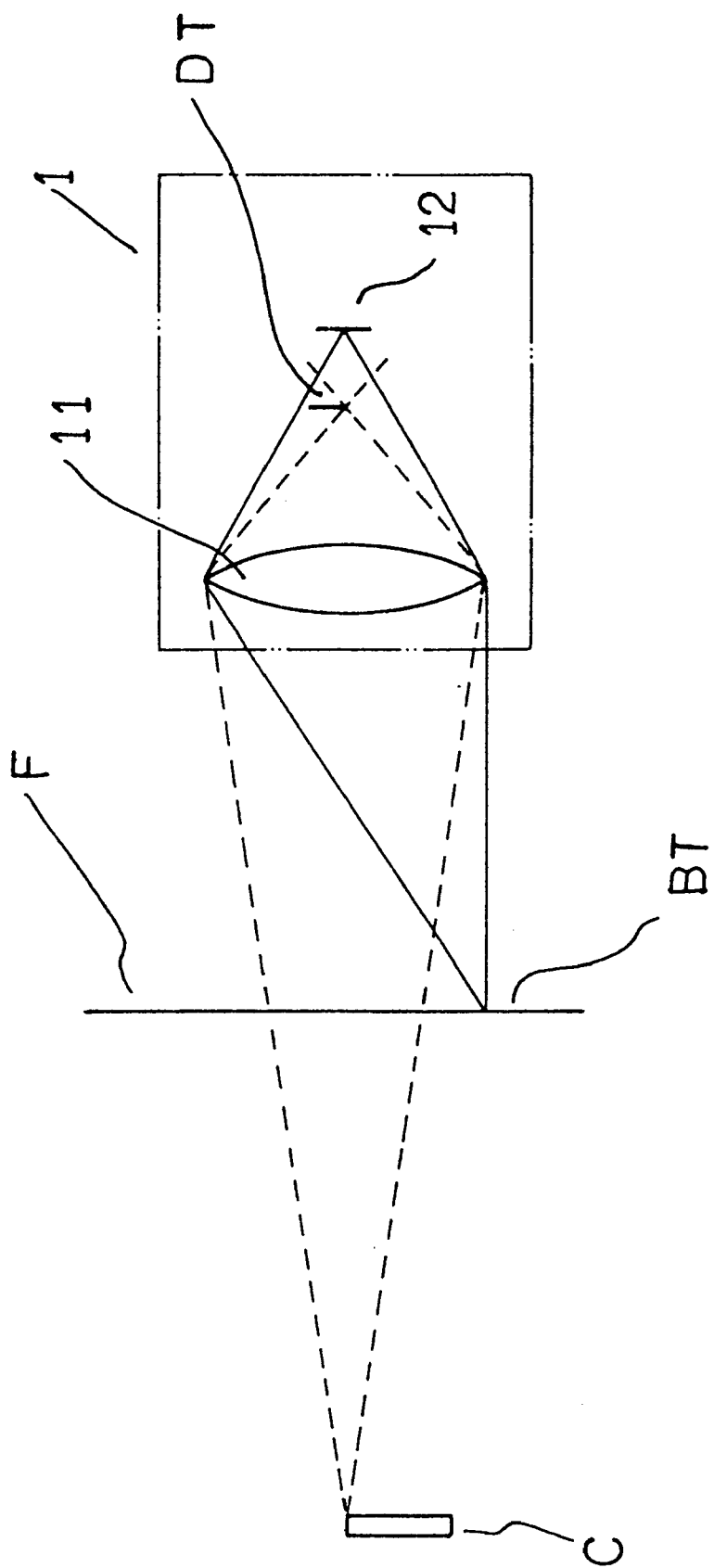
FIG. 2 is a diagram showing a first operation mode of the present invention.

In the assembly of the proceeding elements, as shown in FIGS. 1, 2, the photography device 1 is disposed interior of a vehicle, at a proper position adjacent the windshield thereof and the control unit 3 is mounted onto the windshield wiper system 4. The focus BT of the photography device 1 is set on the transparent windshield glass F. Because of the transparency of the windshield glass, the images caught by the image detection device 12 (being a CCD or CMOS) are most from the scenery objects C on the other side of the windshield glass F. Those objects C can not be precisely focused into images DT on the image detection device 12 due to the distances not being correctly measured. The images DT are too blur to see, but the image intensity is very smoothly distributed. In a spatial domain, the corresponding gray values of two neighboring pixels have a very small difference, hereinafter only gray value for black and white is concerned, i.e., $\{v|v=|X_{ij}-X_{ij+1}|, i=1, 2, \ldots N, j=1, 2 \ldots M\}$ which is very small in general. [X: gray value; i j are respective coordinates; v: the difference of gray value of two neighboring pixels]. In other words, it can be indicated as the Moments of gray value in its spatial domain $\mu_k = E[X-E(X)]^k$, [E: Expectation value, k is a parameter, v: difference of gray value of two neighboring pixels], with respect to a focal image, is very small. In the following example, k=2, it is a second order Moments, and it can be also called Variance. In case of a spatial frequency domain, it can be stated that its components of spatial frequency domain most fall in a low frequency section, and high frequency section takes up only a very small portion.

Figure 3:
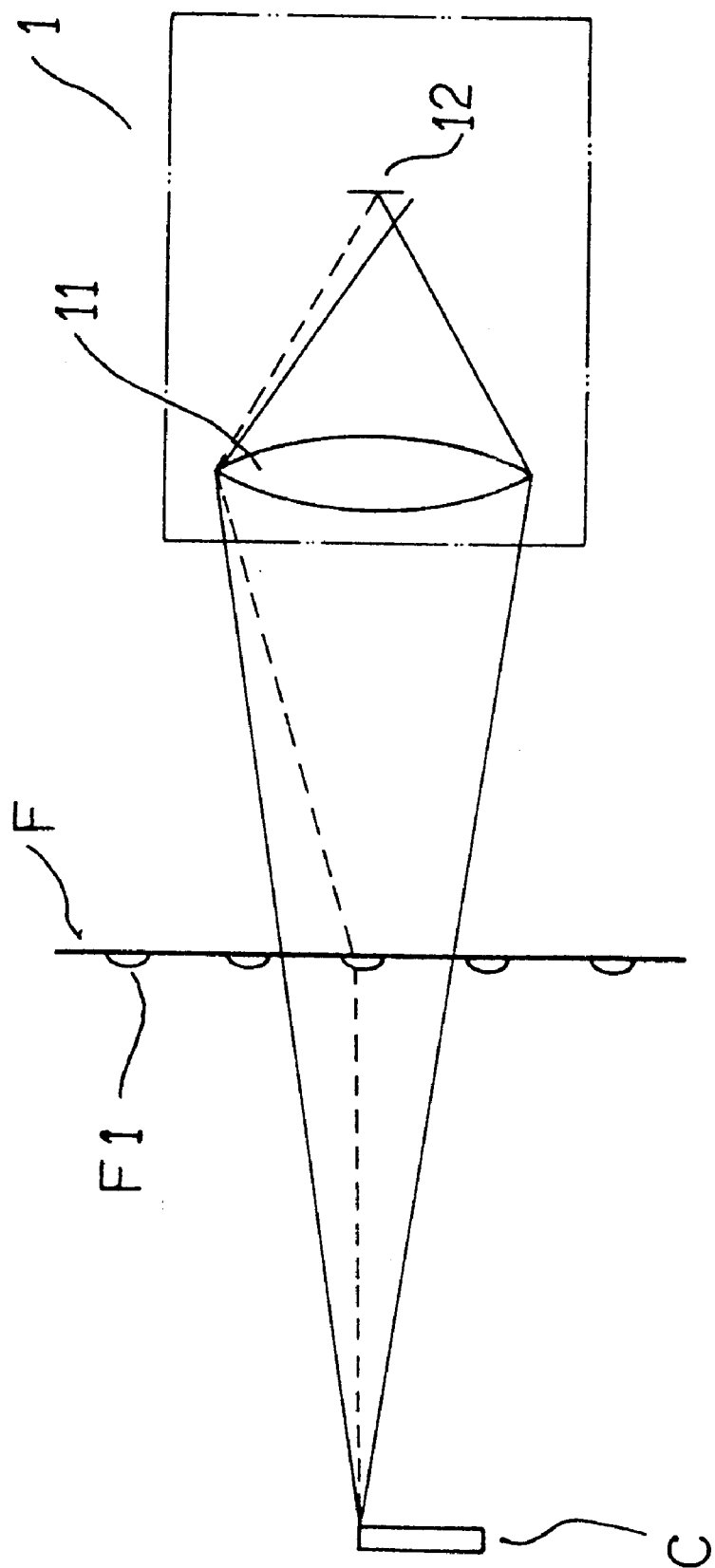
FIG. 3 is a diagram showing a second operation mode of the present invention.
Figure 4:
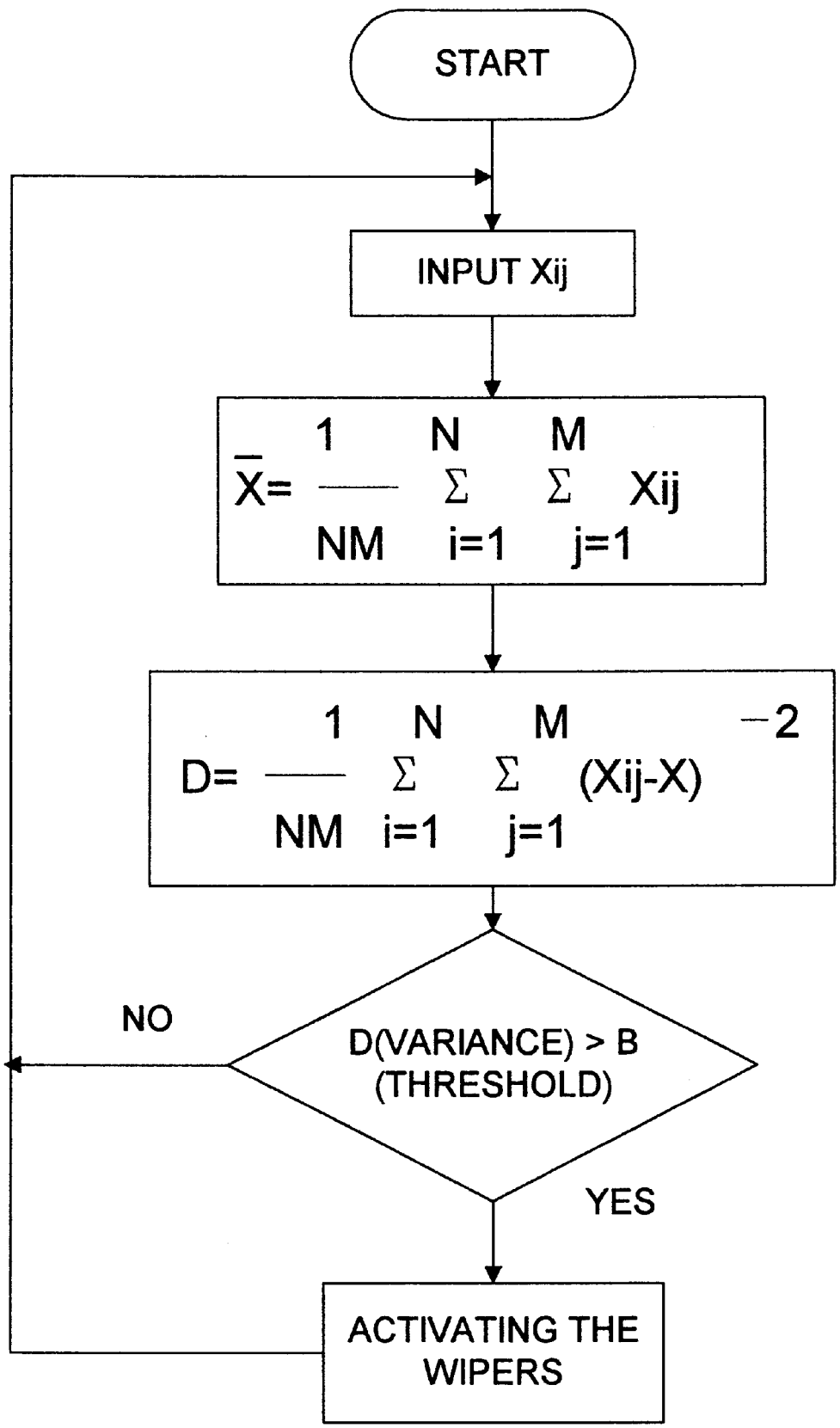
FIG. 4 is a flow chart of the first operation mode thereof.

Then, it can be realized, as shown FIGS. 3, 4, that when a rain drop F1 falls on the windshield glass F, the light beam of the scenery object C on the opposite side going through the rain drop F1 will be distracted in different angles and projected onto the image detection device 12 because the rain drop is theoretically transparent and round. Some images have focus effects, resulting in the relative increase in the Variance of the gray value on the image detection device 12. The greater the density of rain drops is, the higher level the focus effects enjoy, causing the Variance to become larger. We put it in a flow chart and express it in the following equation:

1. Taking the values of pixels(i.e. taking the gray values of $X_{ij}$).
2. Calculating to get the average of the gray values $\overline{X}$.

$$X \text{ is an average gray value} = \frac{1}{NM}\sum_{i=1}^{N}\sum_{j=1}^{M} X_{ij}$$

3. Calculating to obtain a Variance D $$D = E[X - E(X)]^2 = \frac{1}{NM}\sum_{i=1}^{N}\sum_{j=1}^{M}(X_{ij} - X)^2$$

D is a Variance. $X_{ij}$ is the gray value of the pixel at a point whose coordinate is designated as ij on the detection device.

4. Checking if a Variance is larger than the Threshold B

Now, we can use the value of Variance D as a reference parameter for indication of the level of dirtiness and transparency of a windshield glass. Besides, a Threshold B can be preset internally as a critical value, which can be adjusted by a driver according to his or her preference. As the Variance D is larger than the Threshold B, it stands for that the density of rainwater cast on the windshield glass is too high, i.e., the windshield is too blur for a driver to see through. Then the control unit 3 will activate the wiper system 4 to wipe off the rainwater on the windshield glass and the speed at which the Variance D increases determines the operation speed of the wipers. In other words, the faster the Variance D increases, the faster the wipers operates, and vice versa. When the Variance D becomes smaller than the Threshold B, the wipers stop operating accordingly.

In the proceeding example, only clean and transparent rainwater are put into consideration. If muddy water or filthy rainwater distributed onto the windshield glass, the muddy water can not be effectively wiped off the windshield glass F without the help of water dispenser system 5. So, it is assumed that the photography device 1 is installed inside a vehicle and the internal brightness is lower than the external brightness of the vehicle. As a matter of fact, it is the case in a real situation. When rain drops F1 are transparent, its Variance D increases along with the amount of rain drops, but the average gray value $\overline{X}$ thereof is not variable as a result of the total optical energy cast onto the detection device 12 is not varied. However, in the case of muddy water or rain drops, the optical energy cast into the interior of a vehicle will be decreased due to blockage of the energy by the muddy water. Although the reflected energy by the muddy water is considered, it is far less than the decreased amount of the refracted energy, making the internal brightness of the vehicle lower than the external brightness.

If we divide the image taken by the detection device 1 into a plurality of areas and work to obtain the individual Variance of gray value of those areas as well as the average of gray values $\overline{X}$ thereof. When the Variances of some areas are larger than the Threshold B and their average $\overline{X}$ drops a value of "a" at the same time, and in contrast, other areas having no obvious increase in their Variances D and the average gray value $\overline{X}$ thereof having no distinctive drop at the same time, it is then to be certain that the water shed on the windshield is dirty. In this situation, the control unit 3 starts the water dispenser system 5 and wiper system 4. Besides, the proceeding checking procedure can be repeated to monitor the outcome of cleaning of the windshield so as to make a decision on whether the cleaning operation is completed or not. It can also avoid a false judgement resulting from the getting dark out of the windshield.

Figure 5:
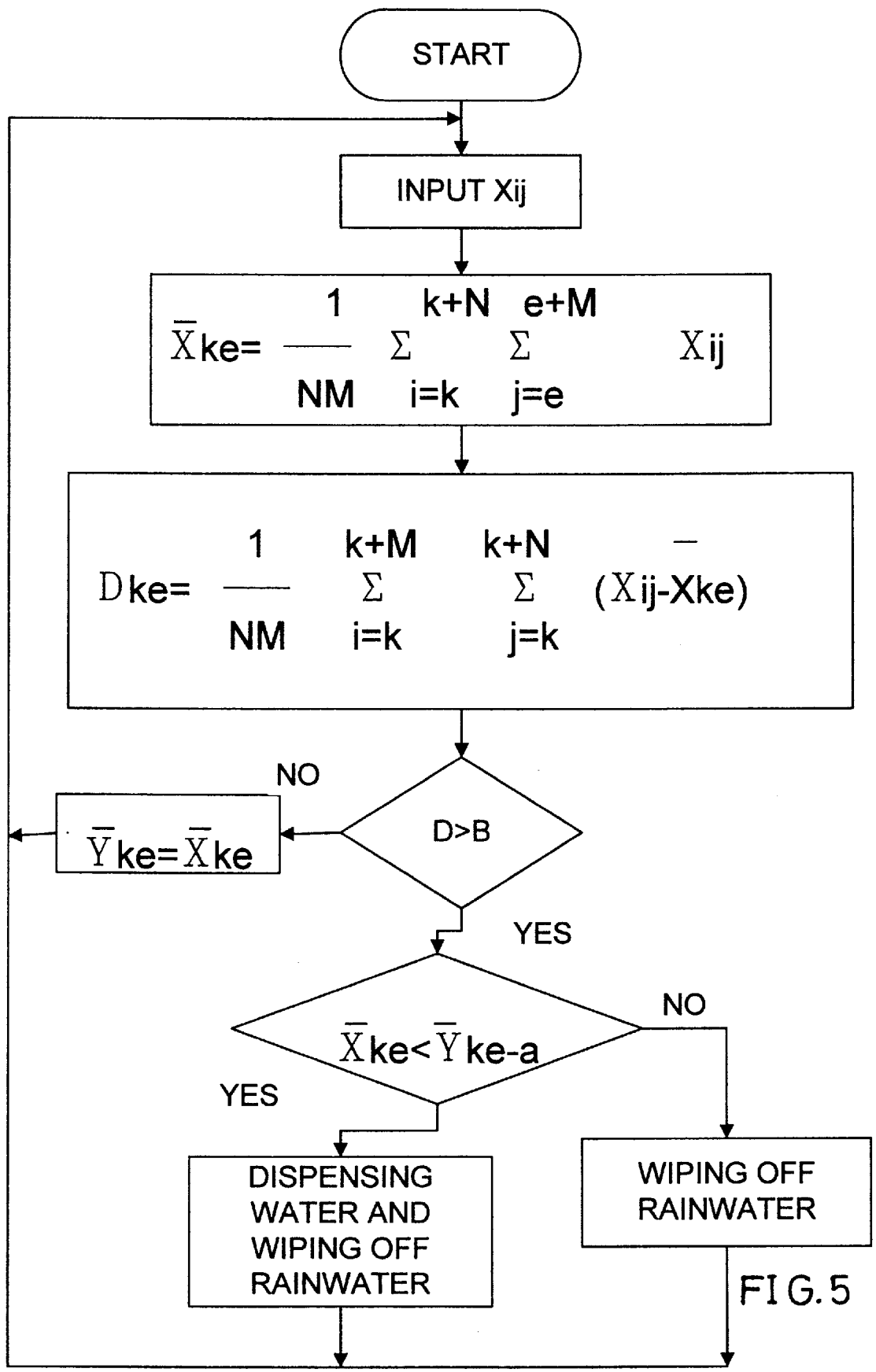
FIG. 5 is a flow chart of the second operation mode thereof.

Now, referring to FIG. 5, the following equations will be explained as below:

$$\overline{X}_{kl} = \frac{1}{NM}\sum_{i=k}^{k+N}\sum_{j=1}^{k+M} X_{ij}$$

K,1 indicates the coordinate of a block area $$Dkl = \frac{1}{NM}\sum_{i=k}^{k+N}\sum_{j=1}^{k+M}(X_{ij} - \overline{X}_{kl})$$

To calculate the Variance D of gray value according to the above equations.

1. When the Variance D is larger than the Threshold B, and
   (1) the $\overline{X}_{k1} < \overline{Y}_{k1}$–a condition is true ($\overline{Y}_{k1}$ stands for the $\overline{X}_{k1}$ value at a previous moment in a memory unit, "a" represents a threshold), the level of dirtiness of the windshield glass F reaches such an extent that the wiper system 4 and water dispenser system 5 must be activated simultaneously by the control unit 3 to do the cleaning.
   (2) the $\overline{X}_{k1} < \overline{Y}_{k1}$–a condition is not true, i.e., $\overline{X}_{k1} \geq \overline{Y}_{k1}$–a is right for all. This means all the rain drops on the windshield glass are not dirty at all, and at this moment the control unit 3 only has to activate the wiper system 4.
2. When D>B is not true, i.e., when D [B, $\overline{Y}_{k1} < \overline{X}_{k1}$–a is true for all, the vision at this moment is clear to see, the wiper system and water dispenser system are not in need at all.

In summary, the present invention makes use of simple equations to discern the level of cleanness of a windshield so that the water dispenser system or wiper system can be timely activated to remove muddy spots on a windshield. Besides, the operation speed of the wipers can be automatically regulated in response to the amount of rainwater cast upon a windshield. It thus can free a driver from constant turning on or off the wiper system. It is certainly a breakthrough of the technique in the field of automation of the windshield wiper system.

I Claim:

1. An optically actuated system for automatically controlling a windshield clearing subsystem of a vehicle having a wiper portion and a washer fluid dispensing portion, said optically actuated system comprising:

(a) a photography device for optically acquiring a predetermined set of windshield image data;

(b) a signal processing unit coupled to said photography device for receiving and processing said image data, said signal processing unit generating therefrom a plurality of parameters indicative of windshield obscuration, said parameters including an image intensity variance parameter; and, (c) a control unit coupled to said signal processing unit and the vehicle's windshield clearing subsystem for automatically actuating at least a portion of the windshield clearing subsystem responsive to the value of at least a predetermined one of said parameters, said control unit automatically actuating at least the wiper portion of the windshield clearing subsystem responsive to said variance parameter exceeding a predetermined variance threshold value.

2. The optically actuated system as recited in claim 1 wherein said parameters indicative of windshield obscuration further includes at least first and second average image intensity parameters generated respectively from acquisition time-displaced portions of said windshield image data, said control unit simultaneously actuating the wiper and washer fluid dispensing portions of the windshield clearing subsystem responsive to said variance parameter exceeding said predetermined variance threshold value and one of said first and second average image intensity parameters exceeding the other by at least a predetermined average intensity differential threshold value.

3. The optically actuated system as recited in claim 1 wherein said parameters indicative of windshield obscuration further includes at least first and second average image intensity parameters corresponding respectively to spatially displaced portions of the windshield, said control unit simultaneously actuating the wiper and washer fluid dispensing portions of the windshield clearing subsystem responsive to said variance parameter exceeding said predetermined variance threshold value and one of said first and second average image intensity parameters exceeding the other by at least a predetermined average intensity differential threshold value.

4. An optically actuated system for automatically controlling a windshield clearing subsystem of a vehicle having a wiper portion and a washer fluid dispensing portion, said optically actuated system comprising:

(a) a photography device for optically acquiring in passive manner a predetermined set of windshield image data;

(b) a signal processing unit coupled to said photography device for receiving and processing said image data, said signal processing unit generating therefrom a plurality of parameters indicative of windshield obscuration; and, (c) a control unit coupled to said signal processing unit and the vehicle's windshield clearing subsystem for automatically actuating in simultaneous manner the wiper and washer fluid dispensing portions of the windshield clearing subsystem responsive to the values of predetermined ones of said parameters respectively exceeding predetermined threshold values corresponding thereto.

5. The optically actuated system as recited in claim 4 wherein said photography device is disposed adjacent the vehicle's windshield.

* * * * *